Patented Oct. 10, 1933

1,930,411

UNITED STATES PATENT OFFICE 1,930,411

MANUFACTURE OF CRYSTALLINE MENTHOL

John William Blagden, Essex, England

No Drawing. Application May 31, 1928, Serial No. 282,058, and in Great Britain June 8, 1927

14 Claims. (Cl. 260—153)

The catalytic hydrogenation of compounds such as thymol, piperitone and menthone leads, as is known, to a crude, optically inactive hydrogenation product which can be subjected to purification or to treatment in various ways, for example, to a treatment such as is described in U. S. Patents No. 1,811,711, dated June 23, 1931, and No. 1,811,777, dated June 23, 1931, both granted to me, so as to yield a crystalline solid having an odor and taste resembling that of natural laevo-menthol and melting at varying temperatures up to 34° C. according to the degree of purification of the crude hydrogenation product effected.

By cooling the product of the hydrogenation, it is possible to cause the separation of a crystalline menthol which after recrystallization melts at about 34° C. This product has also been isolated from the product of the catalytic hydrogenation of thymol by a process based on fractional crystallization of the mixture of esters obtained by esterifying the hydrogenated thymol, an ester being ultimately obtained which on saponification yielded the crystalline menthol of melting point 34° C.; this body of melting point 34° C. has hitherto been regarded as a pure chemical product (compare Journal of the Chemical Society, Vol. 101, page 109 et seq.).

Applicant has found that by subjecting synthetic hydrogenation menthol to partial esterification, separating the unesterified menthol and the esterified menthol and saponifying the latter, it is possible to separate the parent menthol into fractions of different melting point, and that in this manner there can be isolated a crystalline fraction of higher melting point than the parent material. A similar result is obtained by partially saponifying an ester of the synthetic menthol, separating the liberated menthol and the unsaponified ester, and saponifying the latter. Applicant's invention is based on this discovery, and consists in a treatment of synthetic hydrogenation menthol for the purpose of isolating a crystalline fraction of higher melting point than the parent menthol, the essential step in which treatment consists in the separation of the menthol and the esterified menthol contained in a mixture made by partially esterifying the synthetic menthol or by partially saponifying an ester of the synthetic menthol. Saponification of the separated esterified menthol may be necessary for isolating a menthol fraction of raised melting point; in cases, however, in which the separated menthol itself constitutes a fraction of raised melting point, saponification of the separated esterified menthol is not essential, although it may be desirable for recovery of the menthol, it may be for further treatment as is hereinafter described.

The invention may be carried out by fractionally esterifying the menthol and saponifying separately one or more of the fractions of esters so obtained; or an ester of the menthol may be fractionally saponified, one or more of the menthol fractions liberated being separately recovered.

Thus, if a synthetic hydrogenation menthol be converted by one of the usual methods of esterification, into a menthol ester of an organic acid, and the ester be fractionally saponified, the fraction of menthol liberated during a certain stage of the saponification has a considerably higher melting point than the parent menthol. So also, if the menthol is fractionally esterified, the fraction of the ester produced during a certain stage of the esterification yields on saponification a menthol of higher melting point than the parent menthol; in this case in order to separate the menthol into two fractions it is sufficient merely to esterify the menthol partially, and to saponify the ester so produced after separation from unesterified menthol.

At other stages of the process of fractional saponification, or fractional or partial esterification, there may be produced a crystalline menthol of lower melting point, or a menthol which is liquid at ordinary temperature. These menthols may be treated again by the process of the invention, if desired, together with a further quantity of parent menthol; or, if desired, the menthol of lower melting point, particularly when liquid at ordinary temperature, may be treated by the processes described in the specifications to United States Patents No. 1,811,711, dated June 23, 1931, and No. 1,811,777, dated June 23, 1931 both granted to me. The organic acid used in the step of esterification may be recovered and used again in the process.

For example, crystalline synthetic hydrogenation menthol, such as that produced by the process described in either of the aforesaid specifications, is converted into an ester of an aliphatic or aromatic organic acid, for example into a phthalic ester, and the ester is fractionally saponified, for example, with a dilute solution of caustic alkali, the menthol liberated in the several stages of the saponification being separately recovered. The menthol obtained in the earlier stage or stages of the saponification has a melting point which may be higher by several degrees than the crystalline menthol serving as the parent material. Alternatively the parent menthol may be treated, under conditions for esterification, with an organic acid, such as phthalic acid (or its anhydride) in quantity insufficient for converting the whole of the menthol into the ester; by separating the ester from the unesterified menthol, and subjecting it to saponification, a crystalline menthol may be obtained having a higher melting point than the parent menthol.

It will be understood that a combination of the two methods above described is also within the invention; that is to say, the menthol may be partially esterified, and the ester so obtained may be fractionally or partially saponified.

When the organic acid is a polybasic acid, for example phthalic acid, the esterification may be conducted under such conditions that either a normal ester or an acid ester of menthol is produced. When an acid ester is produced, it is convenient to carry out the fractional saponification by subjecting the mixture undergoing saponification to steam distillation; the menthol is thus removed from the mixture as it is liberated from its combination with the organic acid, and may be collected in fractions without interruption of the saponification process.

Whilst the invention is applicable to any synthetic hydrogenation menthol, it is generally more convenient, in the case of a menthol which has a melting point considerably below 34° C., or is even liquid at ordinary temperatures, to purify the menthol somewhat by known methods, such as by recrystallization, so as to obtain a product melting, say, in the neighbourhood of 30° C., this product being then treated in the accordance with the invention.

The following examples illustrate the invention:—

Example 1.—100 parts of a synthetic hydrogenation menthol of melting point 30.8° C. were esterified by heating with 100 parts of phthalic anhydride to 200° C. for about 15 minutes. The acid ester so obtained was then saponified with a solution in 2260 parts of water of 120 parts of a solution of caustic alkali of eight times normal strength. During the saponification the mass was subjected to steam distillation, the distillate being collected in fractions. From the first fraction there were recovered 45-50 parts of a menthol having a melting point of 36.5° C; the menthol recovered from the second fraction had a lower melting point than the starting material.

Example 2.—200 parts of a synthetic hydrogenation menthol of melting point 29.8° C. were partially esterified by heating with only 100 parts of phthalic anhydride at 200° C. for about 15 minutes, after which the unchanged menthol was removed by steam distillation. The ester so obtained was then saponified by means of an alkali, and yielded 100 parts of menthol melting at 35° C. By combining the saponification with steam distillation and collecting the product of saponification fractionally in the manner described in Example 1, a menthol melting at 36° C. can be obtained.

By one or more repetitions of the processes described in the foregoing examples, that is to say, by subjecting the product of raised melting point obtained by one treatment, to a further treatment or treatments, products of still higher melting point may be obtained.

The term "synthetic hydrogenation menthol" as herein used is to be understood as meaning the optically inactive liquid or solid synthetic menthol constituting the crude or partially purified products of the catalytic hydrogenation compounds containing the menthol nucleus but having a proportion of hydrogen to carbon lower than that of menthol, such as thymol, piperitone, and menthone, or the products obtained by subjecting such hydrogenation products to isomerization as described, for example, in the above-mentioned U. S. Patents Nos. 1,811,711 and 1,811,777.

Having thus fully described and ascertained the nature of the said invention and the best means I know of carrying the same into practical effect, I claim:—

1. A treatment of synthetic hydrogenation menthol, which consists in partially converting the menthol into a menthol ester of an organic acid, separating from the unchanged menthol the menthol ester so produced, saponifying the ester, and recovering the liberated menthol.

2. A treatment of synthetic hydrogenation menthol, which consists in converting the menthol at least in part into a menthol ester of an organic acid, saponifying in a plurality of stages the menthol ester so obtained, and recovering separately the menthol liberated in the several stages.

3. A treatment of synthetic hydrogenation menthol, which consists in converting the menthol at least partly into an acid ester of a polybasic acid, saponifying the acid ester so obtained by treating it with a suitable alkali, subjecting the mixture to steam distillation simultaneously with the saponification, collecting separately at least two fractions of the distillate, and recovering the menthol therefrom.

4. A treatment of synthetic hydrogenation menthol, which comprises the steps of converting synthetic menthol partially into an ester of the menthol, whilst leaving a substantial fraction of the material unesterfied and separating the non-esterified menthol and the esterified menthol.

5. A treatment of synthetic hydrogenation menthol, which comprises the steps of subjecting an ester of the menthol to partial saponification and separating the liberated menthol and the unsaponified ester.

6. A treatment of synthetic hydrogenation menthol, which comprises the steps of converting the synthetic menthol partially into an ester of a polybasic organic acid whilst leaving a substantial fraction of the material unesterified and separating the ester and the unesterified menthol.

7. A treatment of synthetic hydrogenation menthol, which comprises the steps of partially saponifying an ester of the synthetic menthol derived from a polybasic organic acid and separating the liberated menthol and the unsaponified ester.

8. A treatment of synthetic hydrogenation menthol, which comprises the steps of converting the synthetic menthol partially into an acid ester of phthalic acid and separating the ester and the unesterified menthol.

9. A treatment of synthetic hydrogenation menthol, which comprises the steps of partially saponifying an acid phthalic acid ester of the synthetic menthol and separating the liberated menthol and the unsaponified ester.

10. A treatment of synthetic hydrogenation menthol, which consists in partially converting the menthol into an acid menthol ester of a polybasic organic acid, separating from the unchanged menthol the menthol ester so produced, saponifying the ester, and recovering the liberated menthol.

11. A treatment of synthetic hydrogenation menthol, which consists in partially converting the menthol into an acid menthol ester of phthalic acid, separating from the unchanged menthol the menthol ester so produced, saponifying the ester, and recovering the liberated menthol.

12. A treatment of synthetic hydrogenation menthol, which consists in converting the menthol at least in part into an acid menthol ester of a polybasic organic acid, saponifying in a plurality of stages the acid menthol ester so obtained, and recovering separately the menthol liberated in the several stages.

13. A treatment of synthetic hydrogenation menthol, which consists in converting the menthol at least in part into an acid menthol ester of phthalic acid, saponifying in a plurality of stages the acid menthol ester so obtained, and recovering separately the menthol liberated in the several stages.

14. A treatment of synthetic menthol, which consists in converting the menthol at least partly into an acid ester of phthalic acid, saponifying the acid ester so obtained by treating it with a suitable alkali, subjecting the mixture to steam distillation simultaneously with the saponification, collecting separately at least two fractions of the distillate, and recovering the menthol therefrom.

JOHN WILLIAM BLAGDEN.